US012559070B2

(12) United States Patent
Forni et al.

(10) Patent No.: US 12,559,070 B2
(45) Date of Patent: Feb. 24, 2026

(54) METHOD FOR CONTROLLING A BRAKING SYSTEM OF A VEHICLE AND SYSTEM THEREOF

(71) Applicant: FRENI BREMBO S.p.A., Curno (IT)

(72) Inventors: Fabrizio Forni, Curno (IT); Valerio Galizzi, Curno (IT); Massimo Di Stefano, Curno (IT); Alessandro Rossi, Curno (IT); Luca Ugolini, Curno (IT)

(73) Assignee: Brembo S.p.A., Bergamo (IT)

( * ) Notice: Subject to any disclaimer, the term of this patent is extended or adjusted under 35 U.S.C. 154(b) by 762 days.

(21) Appl. No.: 17/281,695

(22) PCT Filed: Sep. 30, 2019

(86) PCT No.: PCT/IB2019/058279
§ 371 (c)(1),
(2) Date: Mar. 31, 2021

(87) PCT Pub. No.: WO2020/070613
PCT Pub. Date: Apr. 9, 2020

(65) Prior Publication Data
US 2022/0017049 A1 Jan. 20, 2022

(30) Foreign Application Priority Data
Oct. 2, 2018 (IT) ........................ 102018000009105

(51) Int. Cl.
*B60T 8/172* (2006.01)
*B60T 13/66* (2006.01)
*B60T 13/74* (2006.01)
(52) U.S. Cl.
CPC ............ *B60T 8/172* (2013.01); *B60T 13/662* (2013.01); *B60T 13/741* (2013.01); *B60T 2270/82* (2013.01)

(58) Field of Classification Search
CPC ...... B60T 8/172; B60T 13/662; B60T 13/741; B60T 2270/82
(Continued)

(56) References Cited

U.S. PATENT DOCUMENTS

2004/0245850 A1 12/2004 Sakai
2007/0278855 A1 12/2007 Hatano
(Continued)

FOREIGN PATENT DOCUMENTS

EP 1911645 A1 4/2008
EP 2995516 A1 3/2016
(Continued)

OTHER PUBLICATIONS

European Patent Office, International Search Report, issued in PCT/IB2019/058279, Dec. 17, 2019, Rijswijk, Netherlands.
Japan Patent Office, Office Action in Application No. JP2021518105, dated Oct. 31, 2023, 10 pages.

*Primary Examiner* — Anne Marie Antonucci
*Assistant Examiner* — Jodi Jones
(74) *Attorney, Agent, or Firm* — Marshall & Melhorn, LLC

(57) ABSTRACT

A method for controlling a vehicle braking system may include receiving a braking request, and first input information representative of the vehicle. The method may also include determining first intermediate information on the basis of first input information and determining a reference force value on the basis of the first input information and of the braking request. The method may also include detecting second input information representative of the braking system at the corner of the vehicle. The method may also include determining an estimated force value on the basis of the first intermediate information and the second input information and determining a control quantity. The method may also include determining a control signal of an electro-
(Continued)

mechanical actuator of a braking system brake caliper based on the control quantity and the reference force value. The method may also include providing the control signal to the electro-mechanical actuator.

11 Claims, 8 Drawing Sheets

(58) Field of Classification Search
 USPC  .... 701/70, 1, 71, 80, 78, 74, 72, 36, 83, 48,
 701/37
 See application file for complete search history.

(56) References Cited

U.S. PATENT DOCUMENTS

| | | | | |
|---|---|---|---|---|
| 2018/0056959 A1* | 3/2018 | Pennala | .................. | B60T 7/042 |
| 2018/0056964 A1* | 3/2018 | Pennala | .................. | B60T 17/22 |
| 2018/0079403 A1* | 3/2018 | Masuda | .................. | B60T 8/172 |
| 2018/0194334 A1* | 7/2018 | Masuda | .................. | B60T 8/172 |

FOREIGN PATENT DOCUMENTS

| | | | |
|---|---|---|---|
| EP | 3009314 A1 | 4/2016 |
| JP | 2007161154 A | 6/2007 |
| JP | 2014177205 A | 9/2014 |

* cited by examiner

METHOD FOR CONTROLLING A BRAKING SYSTEM OF A VEHICLE AND SYSTEM THEREOF

CROSS-REFERENCE TO RELATED APPLICATIONS

This application is a National Phase Application of PCT International Application No. PCT/IB2019/058279, having an International Filing Date of Sep. 30, 2019 which claims priority to Italian Application No. 102018000009105 filed Oct. 2, 2018, each of which is hereby incorporated by reference in its entirety.

FIELD OF THE INVENTION

The present invention relates to a braking system of a vehicle, in particular to a method for controlling a braking system of a vehicle and system thereof.

BACKGROUND ART

Modern vehicles, such as passenger cars, are increasingly more frequently fitted with electronic braking systems using BBW (Brake By Wire) technology.

In a BBW electronic braking system, there are typically force sensors which detect the force applied by a pair of brake pads on a respective brake disc.

Indeed, during the step of braking, it is essential to know such a force so that it can be modulated by the BBW electronic braking system with a typical closed-loop control by comparing the force value detected by the force sensor with a reference force value required for braking, by the vehicle driver or by an electronic driver assistance system, in order to ensure that the braking force reaches such a required reference force value.

Such a comparison is performed not only in the typical cases of braking requests but also in those specific cases in which the BBW electronic braking system must respond to requests from other electronic systems with which the vehicle may be equipped, e.g. such as the Antilock Braking System (ABS) or the Electronic Stability Control System (ECS) or it must respond to low grip conditions of the vehicle itself.

For a BBW electronic braking system to ensure such control by responding to the required and increasingly stringent functional safety requirements, the force sensors used in this type of system must follow a specific development process which can ensure reaching extremely high performance and reliability levels.

For this reason, such force sensors are very expensive and evidently this has an impact on the overall cost of the braking system and thus of the vehicle itself.

Solution

It is the object of the present invention to devise and provide a method for controlling a braking system of a vehicle which allows at least partially avoiding the drawbacks described above with reference to the prior art and which in particular ensures extremely high performance and reliability at the lowest possible cost.

Such an object is achieved by a method as described and claimed herein.

The present invention also relates to an electronic system for controlling a braking system of a vehicle.

Some advantageous embodiments are also described.

FIGURES

Further features and advantages of the method and system according to the invention will be apparent from the following description of preferred embodiments, given by way of indicative, non-limiting examples, with reference to the accompanying figures, in which.

DESCRIPTION OF PREFERRED EMBODIMENTS

Figure 1:
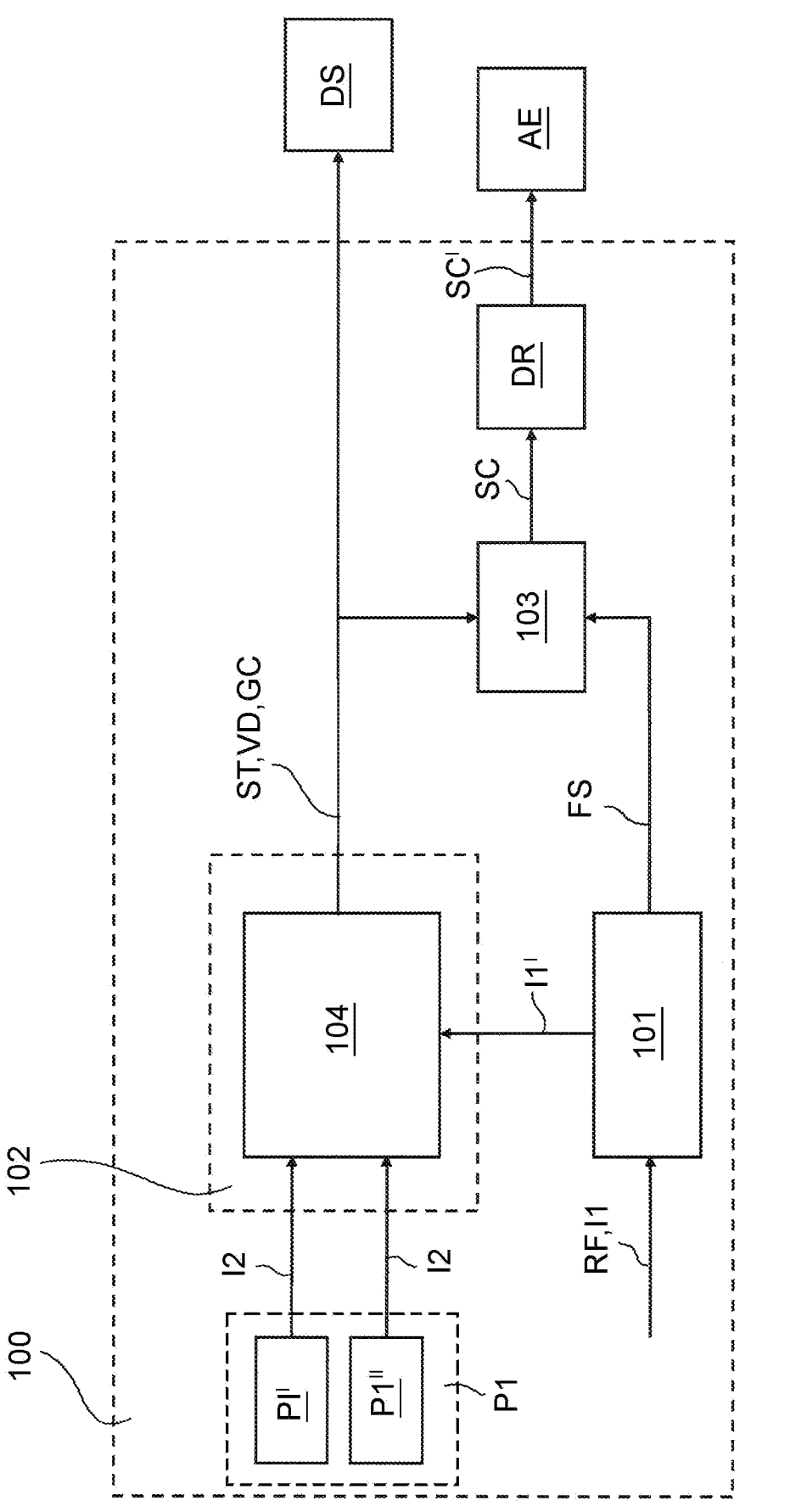
FIG. 1 shows, by means of a block chart, an electronic system for controlling a braking system of a vehicle, according to an embodiment of the invention.

With reference now to FIGS. 1-4, reference numeral 100 indicates as a whole an electronic system for controlling a braking system of a vehicle, hereinafter also electronic system or simply system, according to the present invention.

It is worth noting that equal or similar elements in the figures will be indicated by the same numeric or alphanumeric references.

For the purposes of the present description, vehicle means any vehicle or motorcycle, also of commercial type, having two, three, four or more wheels.

Furthermore, braking system, also not shown in the figures, means the whole of all the components (mechanical and/or electric or electronic, also the brake fluid) which contribute to generating the service braking of a vehicle or to generating the parking-braking of a vehicle.

With general reference to FIGS. 1-4, the system 100 comprises a vehicle control module 101.

The vehicle control module 101, e.g. a hardware module or software logic in a main hardware module, is configured, as one of its intended tasks, to receive a braking request RF (deceleration request).

Such a braking request RF may come from a brake pedal (not shown in the figures) which can be actuated by the vehicle driver and, for example, may be processed by a logic of the EBD (Electronic Brake-force Distribution) type (not shown in the figures) implemented by the vehicle control module 101 or may come from an automatic driver assistant logic of the vehicle, e.g. a logic of the AEB (Autonomous Emergency Brake) type (also not shown in the figures).

The vehicle control module 101 is further configured to receive first input information I1 representative of the vehicle.

For the purposes of the present description "first input information I1 representative of the vehicle" means information detected and/or estimated coming from detecting devices (real or virtual sensors) installed on the vehicle, i.e. at the corners (front or rear of the vehicle), but not necessarily related to the braking system of the vehicle.

Examples of such first input information I1 representative of the vehicle are:

braking request, meaning the position and/or pressure of the brake pedal;

pressure/force measured and/or estimated on a vehicle corner;

vehicle dynamics variables (longitudinal acceleration Ax; lateral acceleration Ay; yaw rate);

speed wheel;

other estimates suitable for calculating slip, e.g. such as: brake status, tire status, vehicle status and so on.

The vehicle control module 101 is configured to determine first intermediate information I1' on the basis of said first input information I1.

Such first intermediate information I1' is mathematical processing of such first input information I1, e.g. a derivative, a filtering (e.g. mean, median, FIR filter, IIR filter and so on).

In more detail, the first intermediate information I1' comprises:

filtered and/or derived and/or processed information I1;

deceleration request, obtained from the vehicle control module 101 (e.g. with EBD logic) on the basis of the braking request (brake pedal position and/or pressure);

slip angle or simply slip;

wheel deceleration;

difference between vehicle front axle average slip angle and vehicle rear axle average slip;

difference between vehicle front axle slip angle and vehicle rear axle slip angle of the wheels of the same axle;

vehicle status estimation (mass; distribution, i.e. the different distribution of the braking torque on the individual wheels of the vehicle; active controls, e.g. EBD or ESP (Electronic Stability Program).

Furthermore, the vehicle control module 101 is configured to determine a reference force value FS on the basis of the first input information I1 and of the braking request RF.

Figure 6:
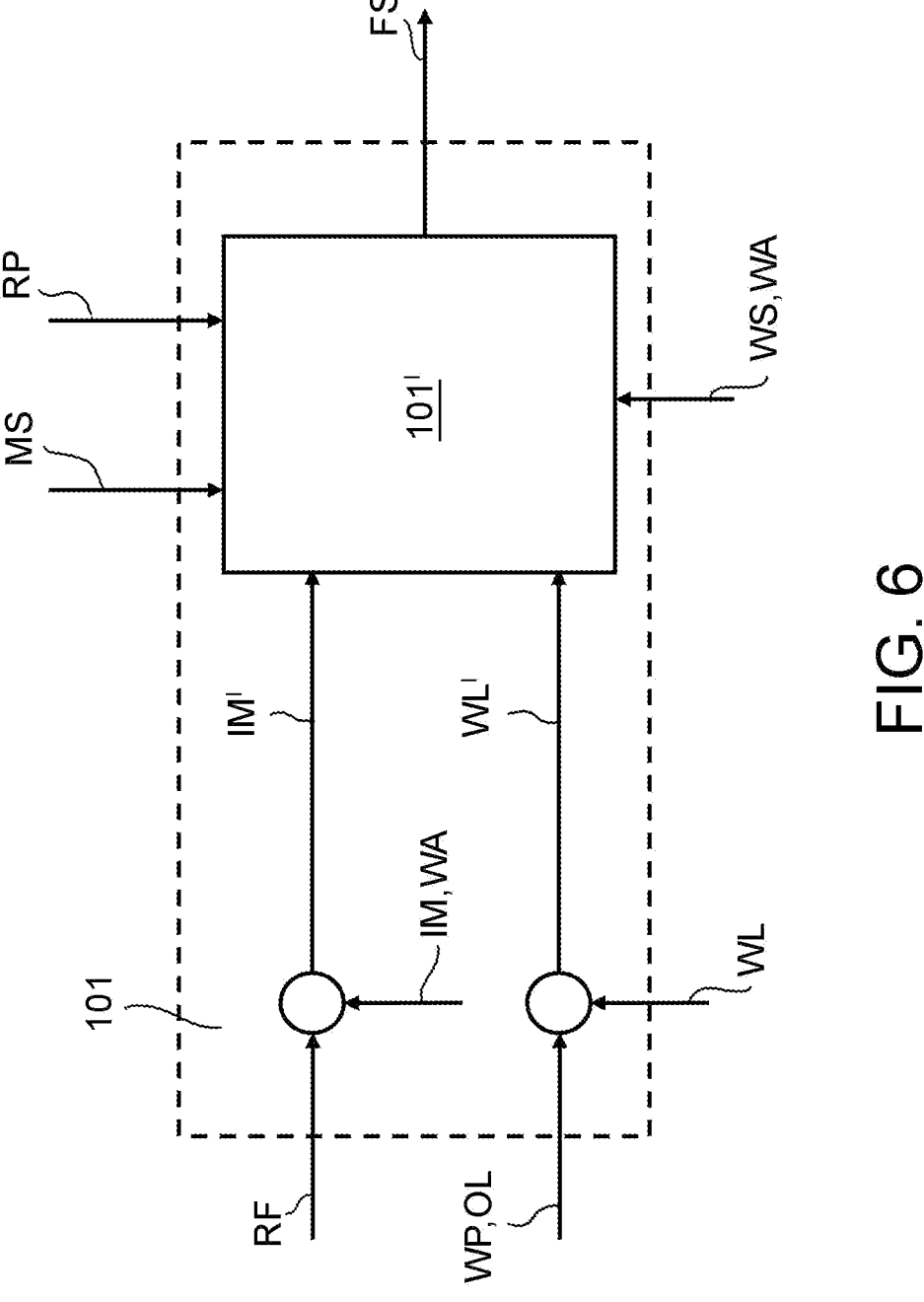
FIG. 6 shows, by means of a block chart, a component of an electronic system for controlling a braking system of a vehicle, according to an embodiment of the invention.

A calculation example of the reference force value FS will be provided below with reference to FIG. 6.

Turning back in general to FIGS. 1-4, the system 100 further comprises a first plurality P1 of detecting devices operationally associated with a corner of a vehicle.

The first plurality P1 of detecting devices are configured to detect second input information I2 representative of the braking system at a vehicle corner.

For the purposes of the present description "second input information I2 representative of the braking system at a vehicle corner" means information located at the vehicle corner.

In more detail, in an embodiment, the first plurality P1 of detecting devices comprises a first plurality P1' of physical sensors or switches, e.g. such as, for example, position sensors, electrical voltage sensors, electrical current sensors, temperature sensors and so on.

In such a case, the second input information I2 representative of the braking system is, for example:

the position of the electro-mechanical actuator of the brake caliper;

quantities derived from the position of the electro-mechanical actuator of the brake caliper, such as, for example: speed, acceleration or the derivative of acceleration (tear or jerk);

the electrical voltage/PWM (Pulse With Modulation) of the electric motor to move the electro-mechanical actuator and other derived quantities (e.g. electrical voltage peaks, filtered media, electrical power derived with electrical current and so on);

the electric current drawn by the electric motor and other derived quantities (e.g. electric current peaks, filtered average, electric power derived with electric voltage, consumption estimation, efficiency and drawn electric power and so on);

the external temperature of the electro-mechanical actuator and/or the electric motor.

Furthermore, in a further embodiment (shown in the figures), the first plurality P1 of detecting devices may comprise, in addition to the first plurality P1' of physical sensors, a second plurality P1'' of force sensors or switches, which can be made for example in hardware or by implementing a software logic.

Examples of such force sensors or switches are a start of load force switch, a force sensor with a limited range in the first part of the stroke of the electro-mechanical actuator piston, a software estimator passing from the gap zone (no-load position) to the load zone by the electro-mechanical actuator piston.

In such a case, the second input information I1 representative of the braking system comprises, for example, information representative of the start of the force step from the electro-mechanical actuator, i.e. information (for example, a flag) representative of the start of the load step, in which the electro-mechanical actuator piston starts to apply force and moves from a no-load position to a position in which it starts to load on the brake caliper.

It is worth noting that, in a logic or software configuration, the information representative of the start of the force step by the electro-mechanical actuator is determined by a force sensor or switch P1'' by comparing quantities, such as speed, acceleration, gradients, current, position, application time or derivatives of these quantities, with their respective reference thresholds.

With reference again in general to FIGS. 1-4, the system 100 further comprises a force estimation and validation module 102.

The force estimation and validation module 102, e.g. a hardware module or a software logic in a main hardware module, is configured to determine a value of an estimated force ST on the basis of said first intermediate information I1' and said first input information I2.

Calculation examples of the estimated force value ST will be provided below during the description of the method according to the present invention.

The force estimation and validation module 102 is further configured to determine a control quantity GC.

The determination of the validated force value VD and of the control quality GC will be described hereafter with reference to different embodiments shown in FIGS. 1-4.

Turning back in general to any one the FIGS. 1-4, the system 100 further comprises a brake control module 103.

The brake control module 103, e.g. a hardware module or software logic in a main hardware module, is configured to determine a control signal SC of an electro-mechanical actuator of a brake caliper of the braking system (diagrammatically shown outside the system 100 and indicated by reference A) based on the control quantity GC and of the reference force value FS.

It is worth noting that the SC control signal is, for example, the reference value (set point) of electrical current or electrical voltage (PWM) to be supplied to the electro-mechanical actuator AE of the brake caliper.

Figure 7:
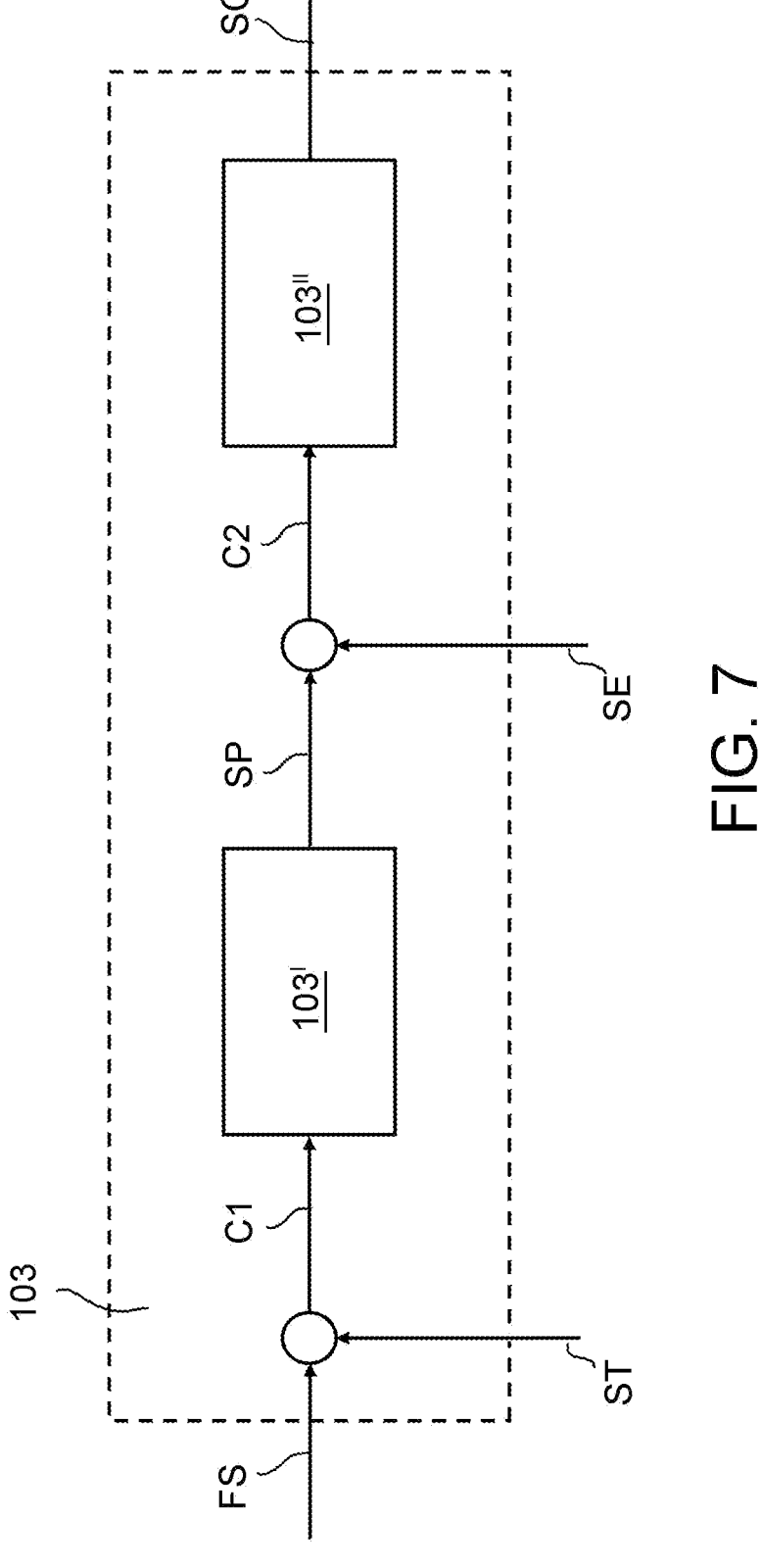
FIG. 7 shows, by means of a block chart, a further component of an electronic system for controlling a braking system of a vehicle, according to an embodiment of the invention.

A calculation example of the control signal SC will be provided below with reference to FIG. 7.

With reference again to FIGS. 1-4, the brake control module 103 is configured to provide such a control signal SC to the electro-mechanical actuator AE.

In more detail, as diagrammatically shown in FIGS. 1-4, the system 100 further comprises an electronic drive module DR for the electro-mechanical actuator.

The brake control module 103 is configured to provide the electro-mechanical actuator AE with the control signal SC by means of the electronic drive module DR.

The drive module DR is configured to receive the control signal SC, thus a braking request level (percentage/PWM), whereby generating a drive signal SC' to be provided to the AE electro-mechanical actuator, e.g. an electric current drive to be provided to the electric motor to move the electro-mechanical actuator AE.

With reference to FIG. 1, in an embodiment, the force estimation and validation module 102 comprises a first force estimation submodule 104.

The first force estimation submodule 104, e.g. a hardware module or a software logic within a main hardware module, is configured to determine the value of an estimated force ST on the basis of said first intermediate information I1' and said first input information I2.

As mentioned above, calculation examples of the estimated force value will be described below in the description of the method according to the present invention.

According to the embodiment in FIG. 1, the first force estimate submodule 104 is configured to determine the control quantity GC on the basis of the estimated force value ST.

According to a first embodiment, shown in FIG. 1 and in combination with the preceding one, the vehicle control module 101 is configured to provide the determined reference force value FS, on the basis of the first input information I1 and of the braking request RF, directly to the brake control module 103.

In this embodiment, the control braking control module 103 is configured to determine the control signal SC of an electro-mechanical actuator AE of a brake caliper of the braking system on the basis of the control quantity GC and of the reference force value FS.

It is worth noting that, in this embodiment, the control quantity representative of the validated force value is the estimated force value which is still validated by the first force estimation submodule so as to ensure a sufficient robust force level for controlling the electro-mechanical actuator AE. Such an estimated force value is validated by the feedback received from other sensors and/or the dynamic response of the vehicle.

According to an embodiment, shown in FIG. 1 and in combination with the preceding ones, the first force estimation submodule 104 is configured to provide the estimated force value to a vehicle diagnostics and safety module DS with which the vehicle is equipped.

The vehicle diagnostics and safety module DS, e.g. a hardware module or software logic module in a main hardware module, is diagrammatically shown in FIG. 1 outside the system 100.

According to a further embodiment, shown in FIG. 2 and as an alternative to the preceding ones described with reference to FIG. 1, the force estimation and validation module 102 comprises a first force estimation submodule 104 and a second force validation submodule 105.

The first force estimation submodule 104 is configured to determine an estimated force value ST on the basis of said first intermediate information I1' and said second input information I2.

In this embodiment, the system 100 further comprises at least one force sensor SF operatively connected to the second force validation submodule 105.

The at least one force sensor SF has a low ASIL (Automotive Safety Integrity Level) and is therefore low cost.

Examples of said at least one force sensor SF are force sensors with variable robustness from QM (Quality Management) or ASIL type safety level reduced from A to C, such as strain gage, piezo, magneto-elastic and so forth.

The at least one force sensor SF is configured to detect a force value FM applied by the electro-mechanical actuator AE onto the brake caliper of the braking system.

The second force validation submodule 105, e.g. a hardware module or software logic in a main hardware module, is configured to determine the control quantity GC on the basis of the estimated force value ST and of the detected force value FM applied by the electro-mechanical actuator AE onto the brake caliper of the braking system.

It is worth noting that the first force estimation submodule 104 is configured to determine the estimated force value ST without using the information provided by said at least one force sensor SF, i.e. without using the detected force value FM.

The estimated force value ST is instead used by the second force validation submodule 105 to validate the detected force value FM coming from at least one force sensor SF.

Figure 2:
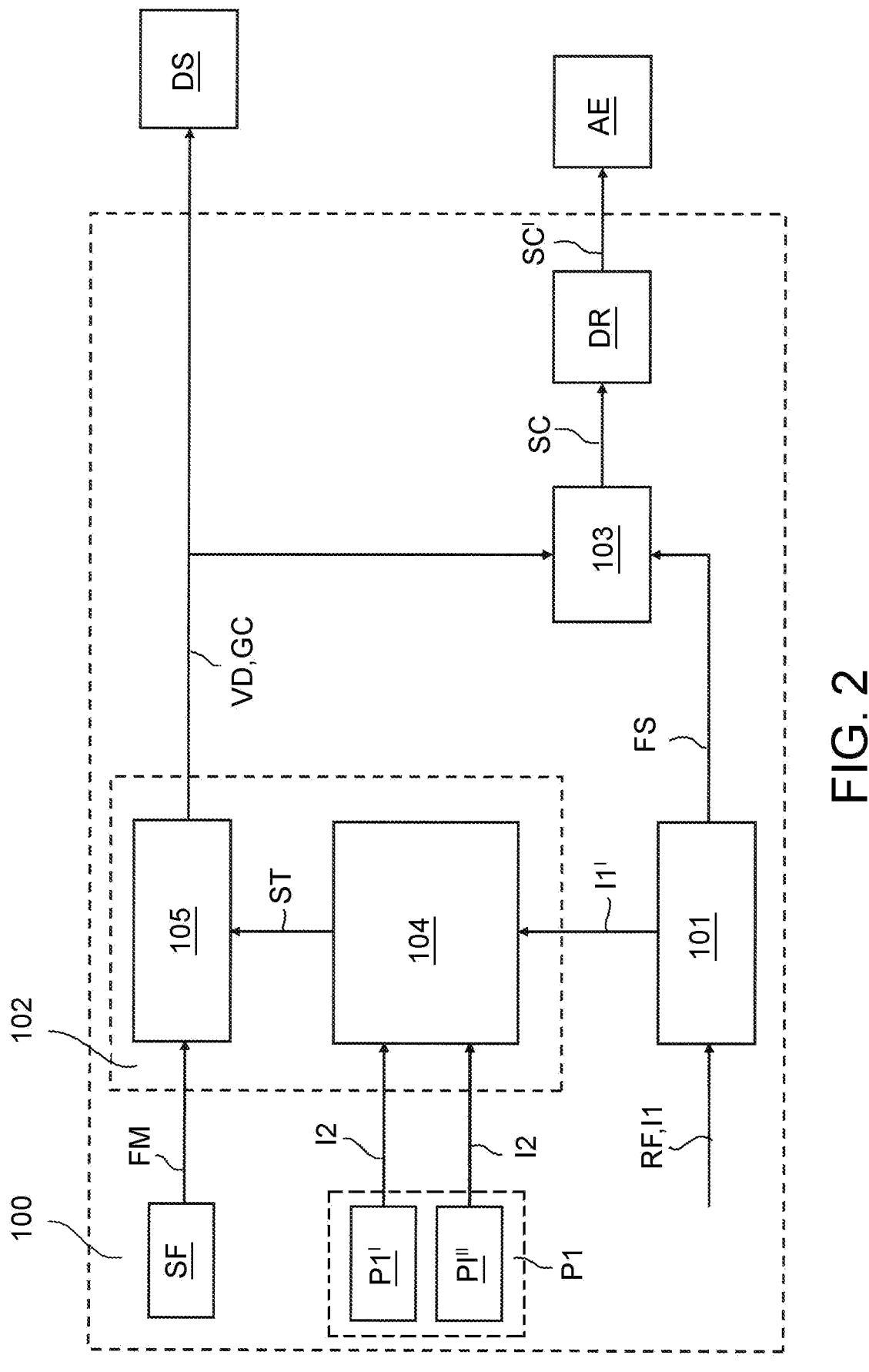
FIG. 2 shows, by means of a block chart, an electronic system for controlling a braking system of a vehicle, according to a further embodiment of the invention.

In this manner, the system 100 according to the embodiment in FIG. 2, by having redundant force information, allows the lowering of the safety level requirements of the at least one force sensor SF which, as mentioned above, may have a low ASIL type safety level, therefore low cost.

The second force validation submodule 105, according to an embodiment, is configured to compare the estimated force value ST and the force value FM detected by at least one force sensor SF and to establish from the result of such a comparison, performed on the basis of acceptance thresholds, how correct is the force value FM detected by at least one force sensor SF with respect to the estimated force value ST and consequently to perform a mathematical processing of the two values, e.g. simple average, weighted average or other types of filtering.

It is worth noting that, according to the system 100 of the embodiment in FIG. 2, it is advantageously possible to determine the validated force value VD also in the case of failure or error of the at least one force sensor FS.

According to a further embodiment, shown in FIG. 2 and in combination with any embodiment described above with reference to FIG. 2, the vehicle control module 101 is further configured to provide the reference force value FS determined on the basis of the first input information I1 and of the braking request RF, directly to the brake control module 103.

Furthermore, in this embodiment, the braking control module 103 is configured to determine a control signal SC of an electro-mechanical actuator AE of a brake caliper of the braking system on the basis of the control quantity GC and of the determined reference force value FS.

It is worth noting that in this embodiment, the control quantity GC is the validated force value VD.

According to an embodiment, shown in FIG. 2 and in combination with those described with reference to FIG. 2, the second force validation submodule 105 is configured to provide the validated force value VD to a vehicle diagnostics and safety module DS with which the vehicle is equipped.

The vehicle diagnostics and safety module DS, e.g. a hardware module or software logic module in a main hardware module, is diagrammatically shown in FIG. 2 outside the system 100.

Figure 3:
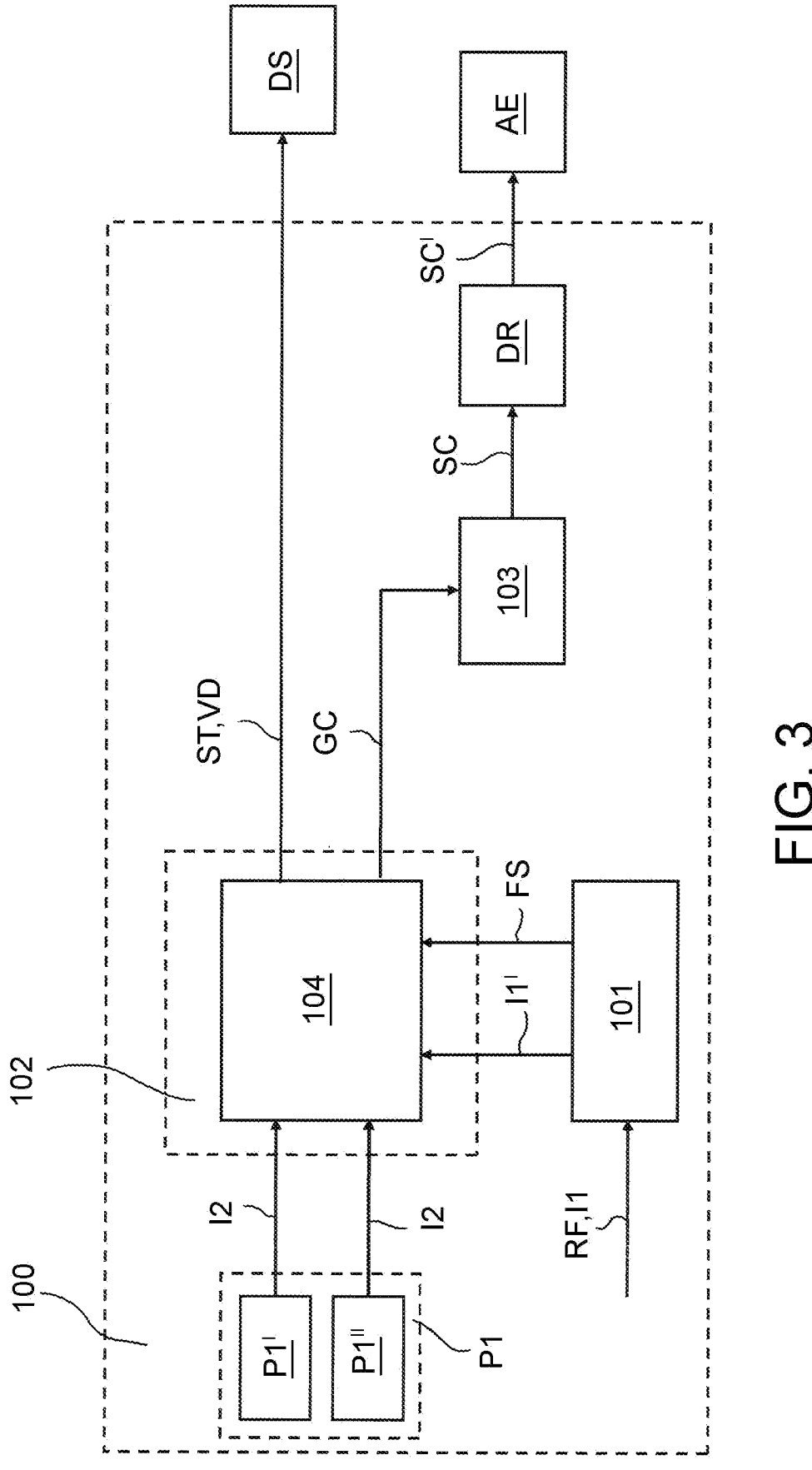
FIG. 3 shows, by means of a block chart, an electronic system for controlling a braking system of a vehicle, according to a further embodiment of the invention.

According to an embodiment, shown in FIG. 3 and in combination with a described embodiment in which the force estimation and validation module 102 comprises the first force estimation submodule 104, the vehicle control module 101 is configured to provide the reference force value FS, determined on the basis of the first input information I1 and of the braking request RF, directly to the first force estimation submodule 104.

In this embodiment, the first force estimation submodule 104 is configured to determine the control quantity GC on the basis of the determined reference force value FS.

It is worth noting that in this embodiment, the validated force value VD is the estimated force value ST.

Furthermore, again in this embodiment, the control quantity GC is a position value of the electro-mechanical actuator AE of the brake caliper of the braking system corresponding to the determined reference force value.

In this embodiment, the control braking control module 103 is configured to determine the control signal SC of an electro-mechanical actuator AE of a brake caliper of the braking system on the basis of the control quantity GC.

According to an embodiment, shown in FIG. 3 and in combination with those described with reference to FIG. 3, the first force estimation submodule 104 is configured to provide the estimated force value ST to a vehicle diagnostics and safety module DS with which the vehicle is equipped.

The vehicle diagnostics and safety module DS, e.g. a hardware module or software logic module in a main hardware module, is diagrammatically shown in FIG. 3 outside the system 100.

Figure 4:
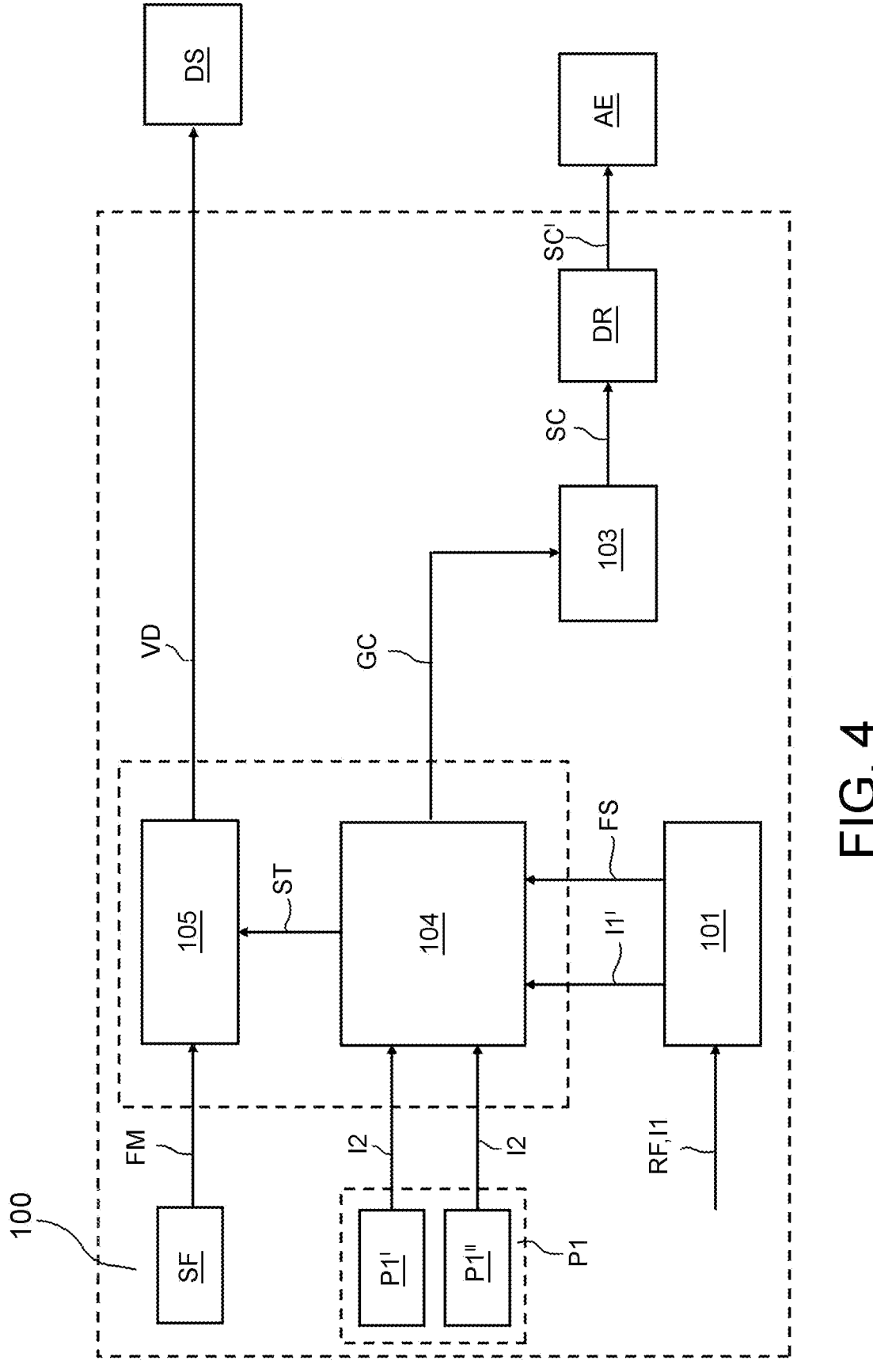
FIG. 4 shows, by means of a block chart, an electronic system for controlling a braking system of a vehicle, according to a further embodiment of the invention.

According to a further embodiment, shown in FIG. 4, in combination with a described embodiment in which the force estimation and validation module 102 comprises the first force estimation submodule 104 and the second force validation submodule 105, the vehicle control module 101 is configured to provide the reference force value FS determined on the basis of the first input information I1 and of the braking request RF, directly to the first force estimation submodule 104.

In this embodiment, the first force estimation submodule 104 is configured to determine the control quantity GC based on the estimated force value ST and the determined reference force value FS.

It is worth noting that in this embodiment, the control quantity GC is a position value of the electro-mechanical actuator AE of the brake caliper of the braking system corresponding to the determined reference force value FS.

In this embodiment, the system 100 further comprises at least one force sensor SF operatively connected to the second force validation submodule 105.

The at least one force sensor SF has a low ASIL (Automotive Safety Integrity Level) and is therefore low cost.

Examples of said at least one force sensor SF are force sensors with variable robustness from QM (Quality Management) or ASIL type safety level reduced from A to C, such as strain gage, piezo, magneto-elastic and so forth.

The at least one force sensor SF is configured to detect a force value FM applied by the electro-mechanical actuator AE onto the brake caliper of the braking system.

In this embodiment, the second force validation submodule 105 is configured to determine the validated force value VD on the basis of the estimated force value ST and of the detected force value FM applied by the electro-mechanical actuator AE onto the brake caliper of the braking system.

The advantages of this configuration are completely similar to those described above with reference to the embodiment in FIG. 3.

According to an embodiment, shown in FIG. 4 and in combination with those described with reference to FIG. 4, the second force estimation submodule 105 is configured to provide the validated force value VD to a vehicle diagnostics and safety module DS with which the vehicle is equipped.

The vehicle diagnostics and safety module DS, e.g. a hardware module or software logic module in a main hardware module, is diagrammatically shown in FIG. 4 outside the system 100.

As already mentioned, each described module may be, for example, a hardware module or a software logic in a main hardware module and these modules can be organized according to different hardware and/or logic architectures.

In the case of the embodiment described with reference to FIG. 2, a first example of architecture could comprise a first electronic control unit ECU1 configured as master unit of the rear axle of the vehicle and a second electronic control unit ECU2, operationally connected to the first electronic control unit EC1, configured as slave unit of the front axle of the vehicle.

According to this first example of architecture, the first electronic control unit EC1 may comprise:

a vehicle control module;

a diagnostic and safety module;

on the rear right corner: a first plurality of detecting devices (physical sensors or switches and force sensors or switches), a force estimation module, a braking control module and a drive module for the electro-mechanical actuator of a brake caliper;

on the rear left corner: a first plurality of detecting devices (physical sensors or switches and force sensors or switches), a force estimation module, a braking control module and a drive module for the electro-mechanical actuator of a brake caliper.

Again, according to this first example of architecture, the second electronic control unit EC2 may comprise:

on the front right corner: a first plurality of detecting devices (physical sensors or switches and force sensors or switches), a force estimation module, a braking control module and a drive module for the electro-mechanical actuator of a brake caliper.

on the front left corner: a first plurality of detecting devices (physical sensors or switches and force sensors or switches), a force estimation module, a braking control module and a drive module for the electro-mechanical actuator of a brake caliper.

Again, in the case of the embodiment described with reference to FIG. 2, a second example of architecture may comprise:

a first electronic control unit ECU1 configured as master unit;

a second electronic control unit ECU2, operationally connected to the first electronic control unit EC1, configured as slave unit of the front left corner of the vehicle;

a third electronic control unit ECU3, operationally connected to the first electronic control unit EC1, configured as slave unit of the front right corner of the vehicle;

a fourth electronic control unit ECU4 operationally connected to the first electronic control unit EC1 configured as slave unit of the rear left corner of the vehicle;

a fifth electronic control unit ECU5, operationally connected to the first electronic control unit EC1, configured as slave unit of the rear right corner of the vehicle.

According to this second example of architecture, the first electronic control unit EC1 may comprise:

a vehicle control module;

a diagnostic and safety module.

Again, in accordance with this second example of architecture:

the second electronic control unit EC2 may comprise:

on the front left corner: a first plurality of detecting devices (physical sensors or switches and force sensors or switches), a force estimation module, a braking control module and a drive module for the electro-mechanical actuator of a brake caliper.

the third electronic control unit EC3 may comprise:

on the front right corner: a first plurality of detecting devices (physical sensors or switches and force sensors or switches), a force estimation module, a braking control module and a drive module for the electro-mechanical actuator of a brake caliper.

the fourth electronic control unit EC4 may comprise:

on the rear left corner: a first plurality of detecting devices (physical sensors or switches and force sensors or switches), a force estimation module, a braking control module and a drive module for the electro-mechanical actuator of a brake caliper;

the fifth electronic control unit EC5 may comprise:

on the rear right corner: a first plurality of detecting devices (physical sensors or switches and force sensors or switches), a force estimation module, a braking control module and a drive module for the electro-mechanical actuator of a brake caliper.

A method 500 for controlling a braking system of a vehicle according to the present invention will be described with reference to the aforesaid figures and to the block chart in FIG. 5.

The method 500 comprises a symbolic step of starting STR.

The method 500 comprises a step of receiving 501, by a vehicle control module 101, a braking request RF.

The control module 101 and the RF braking request were described above.

The method 500 further comprises a step of receiving 502, by the vehicle control module 101, first input information I1 representative of the vehicle.

Such first input information I1 representative of the vehicle was described above.

The method 500 further comprises a step of determining 503, by the vehicle control module 101, first intermediate information I1' on the basis of said first input information I1.

The first intermediate information I1' was described above.

The method 500 comprises a step of determining 504, by the vehicle control module 101, a reference force value FS on the basis of the first input information I1 and of the braking request RF.

A calculation example of the reference force value will be described with reference to FIG. 6.

In particular, the vehicle control module 101 determines, by means of a respective processing block 101', the reference force value FS as a function of the following information representative of the vehicle dynamics, i.e.:

information representative of the speed of the vehicle wheels WS;

information representative of the acceleration of the vehicle wheels WA;

information representative of the slip of a wheel WL' of the vehicle determined by comparing the slip value of the wheel WL with a reference slip value WP and with slip values of other wheels OL;

information representative of the deceleration state of the vehicle, which can be determined, for example, by inertial signals IM' (IMU, Inertial Measurement Unit) determined by comparing the braking request RF (deceleration request) with inertial signals and information representative of the wheel acceleration WA;

the mass MS of the vehicle;

the distribution RP of the vehicle, e.g. between the front and rear axles or between the side axles.

Turning back in general to FIG. 5, the method 500 further comprises a step of detecting 505, by a first plurality P1 of the detecting devices operatively associated with a corner of a vehicle, second input information I2 representative of the braking system at the corner of the vehicle.

The first plurality of detecting devices P1 and the second input information I2 were described above.

The method 500 further comprises a step of determining 506, by a force estimation and validation module 102, an estimated force value ST on the basis of said first intermediate information I1' and said second input information I2.

The estimation and validation module 102 was described above.

The method 500 further comprises a step of determining 507, by the force estimation and validation module 102, a control quantity GC.

The control quantity, according to different embodiments, was described above but will also be described below with reference to different embodiments of the method 500.

Figure 5:
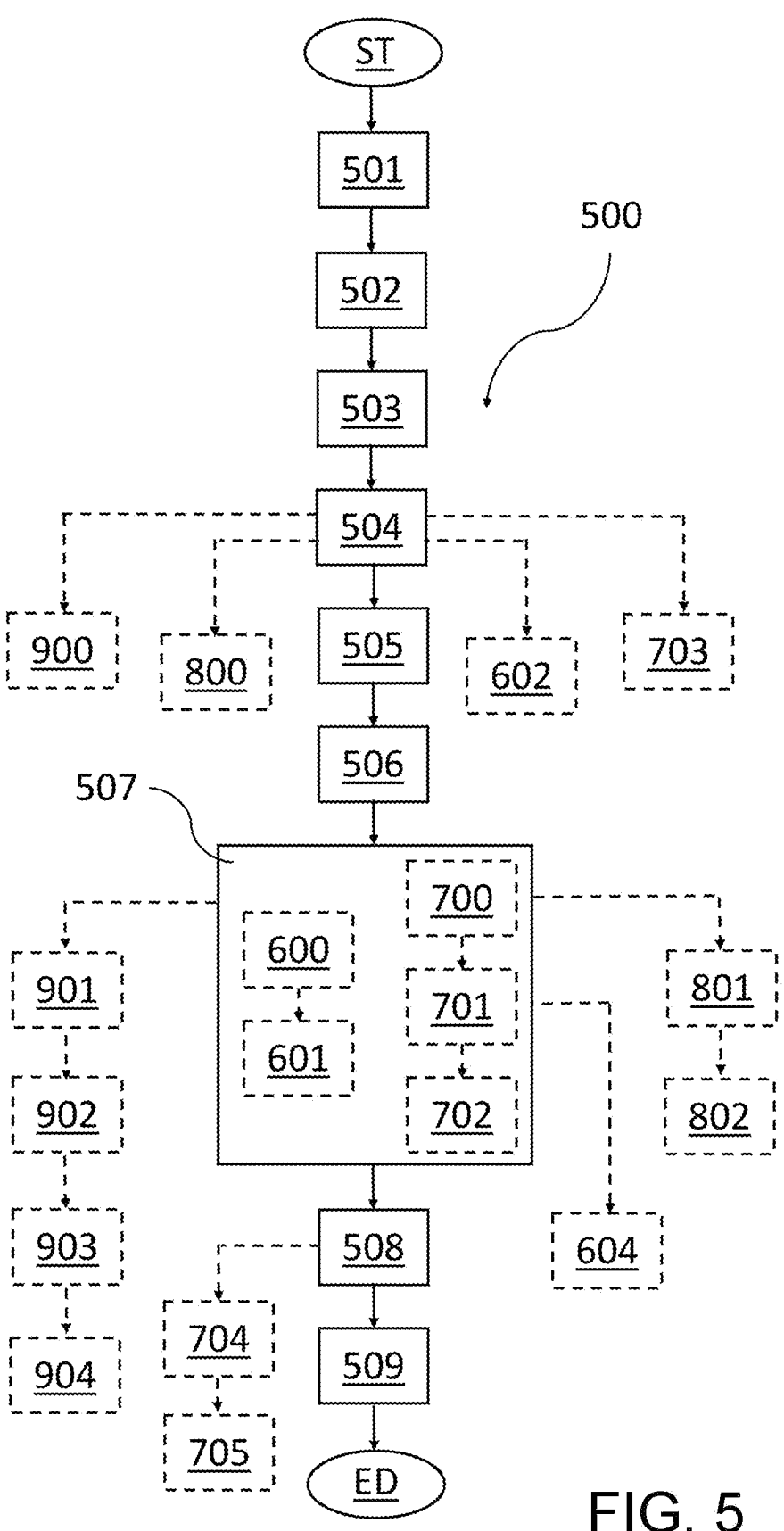
FIG. 5 shows, by means of a block chart, a method for controlling a braking system of a vehicle, according to an embodiment of the invention.

The method 500 in FIG. 5 further comprises a step of determining 508, by a braking control module 103, a control signal SC of an electro-mechanical actuator AE of a brake caliper of the braking system on the basis of the control quantity GC and of the reference force value FS.

The brake control module 103, the control signal SC of an electro-mechanical actuator AE of a brake caliper of the braking system and the electro-mechanical actuator AE have been described above.

A calculation example of the control signal SC will be described below with reference to FIG. 7.

The brake control module 103 compares the reference force value FS with the estimated force value ST and the result of such first comparison C1 is sent as input to a first processing block 103', e.g. a force controller, which generates a reference speed value SP as a function of the first comparison C1.

The brake control module 103 compares the reference speed value SP with an estimated speed value SE and the result of this second comparison C2 is sent as input to a second processing block 103'', e.g. a speed controller, which generates the control signal SC to be sent to the electro-mechanical actuator AE as a function of the result of the second comparison C2.

It is worth noting that the estimated speed value SE is determined, by the first force estimation submodule 104, on the basis of the second input information I2 provided by the first plurality P1 of detecting devices.

Turning back to FIG. 5, the method 500 further comprises a step of providing 509, by the control module braking 103, said control signal SC to said electro-mechanical actuator AE.

The method 500 thus ends with a symbolic step of ending ED.

According to an embodiment, shown with dashed lines in FIG. 5, the force estimation and validation module 102 comprises a first force estimation submodule 104 (already described above).

In this embodiment, the step of determining 507, by the force estimation and validation module 102, a control quantity GC comprises the steps of:

determining 600, by the first force estimation submodule 104, the estimated force value ST on the basis of said first intermediate information I1' and said first input information I1; and determining 601, by the first force estimation submodule 104, the control quantity GC on the basis of the estimated force value ST.

According to an embodiment, in combination with any one of those previously described and shown by dashed lines in FIG. 5, the method further comprises the steps of:

providing 602, by the vehicle control module 101, the determined reference force value FS, on the basis of the first input information I1 and of the braking request RF, directly to the brake control module 103; and determining 603, by the braking control module 103, a control signal SC of the electro-mechanical actuator AE of the brake caliper of the braking system on the basis of the control quantity GC and of the reference force value FS, the control quantity QC being the estimated force value ST.

According to an embodiment, in combination with the preceding one and shown in FIG. 5 with dashed lines, the method 500 further comprises a step of providing 604, by the first force estimation submodule 104, the estimated force value ST to a vehicle diagnostics and safety module DS with which the vehicle is equipped.

According to a further embodiment, alternative to the preceding ones, the force estimation and validation module 102 comprises a first force estimation submodule 104 and a second force validation submodule 105 (already described above).

According to this embodiment, the step of determining 507, by the force estimation and validation module 104, a control quantity GC comprises the steps of:

determining 700, by the first force estimation submodule 104, an estimated force value ST on the basis of said first intermediate information I1' and said second input information I2;

detecting 701, by at least a force sensor SF, operatively associated with the second force validation submodule 105, a force value FM applied by the electro-mechanical actuator AE onto the brake caliper of the braking system;

determining 702, by the second force validation submodule 105, the control quantity GC on the basis of the estimated force value ST and of the detected force value FM applied by the electro-mechanical actuator AE onto the brake caliper of the braking system.

It is worth noting that at least one force sensor SF has already been described above.

According to an embodiment, in combination with the preceding one and shown by dashed lines in FIG. 5, the method 500 comprises the steps of:

providing 703, by the vehicle control module 101, the reference force value FS, determined on the basis of the first input information I1 and of the braking request RF, directly to the brake control module 103;

determining 704, by a braking control module 103, a control signal SC of an electro-mechanical actuator AE of a brake caliper of the braking system on the basis of the control quantity GC and of the determined reference force value FS, the control quantity QC being the validated force value VD.

According to an embodiment, in combination with the preceding one and shown with dashed lines in FIG. 5, the method 500 comprises a step of providing 705, by the second force validation submodule 105, the validated force value VD to a vehicle diagnostics and safety module DS (already described above) with which the vehicle is equipped.

According to a further embodiment, alternative to the those described above and shown with dashed lines in FIG. 5, if the force estimation and validation module 102 comprises the first force estimation submodule 104, the method 500 comprises the steps of:

providing 800, by the vehicle control module 101, the determined reference force value FS, on the basis of the first input information I1 and of the braking request RF, directly to the first force estimation module 104;

determining 801, by the first force estimation submodule 104, the control quantity GC on the basis of the value of the estimated force ST and of the determined reference force value FS.

In this embodiment, the validated force value VD is the estimated force value ST.

In this embodiment, the control quantity GC is a position value of the electro-mechanical actuator AE of the brake caliper of the braking system corresponding to the determined reference force value FS.

In this embodiment, the method 500 further comprises a step of determining 802, by a braking control module 103, the control signal SC of the electro-mechanical actuator AE of a brake caliper of the braking system on the basis of the control quantity GC.

According to an embodiment, in combination with the preceding one, the method 500 comprises a step of providing 604, by the first force estimation submodule 104, the estimated force value ST to a vehicle diagnostics and safety module DS with which the vehicle is equipped.

According to a further embodiment, alternative to the those described above and shown with dashed lines in FIG. 5, if the force estimation and validation module 102 comprises the first force estimation submodule 104 and the second force validation submodule, the method 500 comprises the steps of:

providing 900, by the vehicle control module 101, the determined reference force value FS, on the basis of the first input information I1 and of the braking request RF, directly to the first force estimation module 104;

determining 901, by the first force estimation submodule 104, the control quantity GC on the basis of the value of the estimated force ST and of the determined reference force value FS.

In this embodiment, the control quantity GC is a position value of the electro-mechanical actuator AE of the brake caliper of the braking system corresponding to the determined reference force value FS.

In this embodiment, the method 500 further comprises the steps of:

detecting 902, by at least a force sensor SF, operatively associated with the second force validation submodule 105, a force value FM applied by the electro-mechanical actuator AE onto the brake caliper of the braking system;

determining 903, by the second force validation submodule 105, the validated force value VD on the basis of the estimated force value ST and of the detected force value FM applied by the electro-mechanical actuator AE on the brake caliper of the braking system.

According to an embodiment, in combination with the preceding one and shown with dashed lines in FIG. 5, the method 500 comprises a step of providing 904, by the second force validation submodule 105, the validated force value VD to a vehicle diagnostics and safety module DS (described above) with which the vehicle is equipped.

Some examples of determination of the estimated force value ST which can be executed by the estimation and validation module 102 or by the first estimation submodule 104 are now described.

A first example relates to the use of a logic/model based on a theoretical stiffness curve Fx, i.e. a relation between the force F applied by the electro-mechanical actuator AE and the position P of the piston of the electro-mechanical actuator AE.

Figure 8:
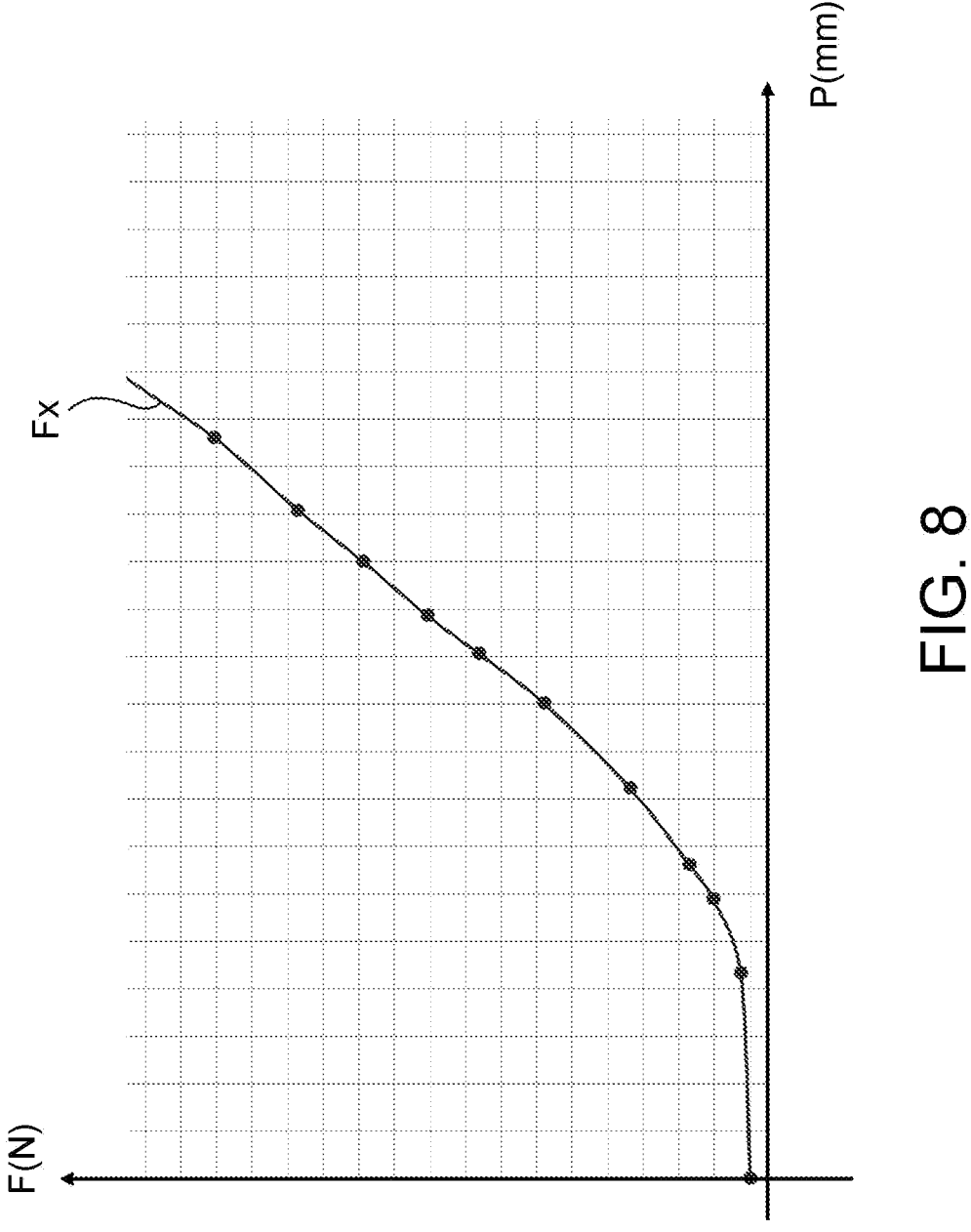
FIG. 8 shows by means of a graph a theoretical stiffness curve between force and displacement, which can be applied in a step of the method according to an embodiment of the invention.

An example of the stiffness curve Fx is shown in the chart in FIG. 8.

A second example relates to the use of a logic/model based on a mechanical equation (dynamic model) of the electro-mechanical actuator AE.

According to this mechanical equation, the estimated force value ST is a function of the following quantities:

position of the electro-mechanical actuator AE;

electrical supply voltage of the electric motor which controls the electro-mechanical actuator AE;

electric current drawn by the electric motor which controls the electro-mechanical actuator AE;

temperature of the electric motor which controls the electro-mechanical actuator AE;

information detected by sensors or force switches.

An example of a mechanical equation is as follows.

$$F_L(V, T) = \eta \frac{2\pi R}{p}\left(K_{MOT}I - K_{MOT}I_{NOLOAD} - J\frac{d\Omega}{dt}\right)$$

wherein:

$\eta$=efficiency;

P=screw pitch;

R=reduction ratio;

$K_{MOT}{}^I$=electric motor torque;

$I_{NOLOAD}$=no-load electric current;

$K_{MOT}I_{NOLOAD}$=component used to take into account static friction;

$J\frac{d\Omega}{dt}$ = inertial torque.

A third example relates to the use of a logic/model based on models with parameter estimation.

An example of model is as follows:

$$\text{Estimated force value} = A_3\varphi^3 + A_2\varphi^2 + A\varphi + B\dot{\varphi}$$

wherein:

$A_3$, $A_2$, A, B=parameter vectors;

$\varphi$=input vector (position of the electro-mechanical actuator, electrical supply voltage of the motor, electrical current drawn by the motor, temperature of the electric motor)

A last example relates to the use of a logic/model based on an adaptive model by means of machine learning techniques for real-time variation of the parameters of the estimation techniques according to the examples described above.

It is worth noting that the object of the present invention is fully achieved.

Indeed, as mentioned before, the estimated force value ST can be used in two different ways:

exclusive use of the estimated force value ST, which must meet the same requirements as those required by the current sensors in terms of functional safety, for example;

partial use of the estimation algorithm in collaboration with a force sensor which, in all cases, by virtue of the presence of an estimation, may have less stringent requirements in terms of functional safety.

The method and system thereof which are the object of this invention allows controlling a braking system with BBW type electronic braking system by estimating the force without using the traditionally employed sensors, typically very reliable but also very expensive, but exploiting a hardware/software model estimating the force which makes use of the measurements of other sensors installed on the vehicle.

The advantage of the method and of the system thereof according to the present invention is to be able to partially replace, or in some cases eliminate, the sensors traditionally used in brake calipers and to use sensors having lower quality and reliability requirements instead, which are for this reason less expensive, ensuring the same required safety level and allowing a reduction in system costs.

Therefore, the method and the system according to the present invention, considering the possibility of being able to reduce the requirements of the force sensor to be applied or even to eliminate the force sensor itself, advantageously allow a considerable reduction in terms of weight and size of the electro-mechanical actuator which can be used (as well as cost as already mentioned).

It is worth noting that the description refers to the estimation of the force and to the closed-loop control of the force to be applied to an electro-mechanical actuator of a BBW type system.

However, the teachings of the present invention may be used to make a method and system thereof for estimating the pressure in a hydraulic system and closed-loop control of the pressure to be applied to an electro-pneumatic actuator in a BBW type system.

A person skilled in the art may make changes and adaptations to the method and respective system described above or can replace elements with others which are functionally equivalent to satisfy contingent needs without departing from the scope of protection of the appended claims. All the features described above as belonging to one possible embodiment may be implemented independently from the other described embodiments.

The invention claimed is:

1. A method for controlling a braking system of a vehicle, the method comprising:

receiving, by a vehicle control module, a braking request;

receiving, by the vehicle control module, first input information representative of the vehicle;

determining, by the vehicle control module, first intermediate information on the basis of said first input information;

determining, by the vehicle control module, a reference force value on the basis of the first input information and of the braking request;

detecting, by a first plurality of detecting devices operatively associated with a vehicle corner, second input information representative of the braking system at the vehicle corner, wherein said second input information is not determined by the vehicle control module;

determining, by a force estimation and validation module, an estimated force value on the basis of said first intermediate information and of said second input information;

wherein the force estimation and validation module comprises a first force estimation submodule and a second force estimation submodule, wherein neither of the first force estimation submodule nor the second force estimation submodule receive a braking request, determining, by the force estimation and validation module, a control quantity based on the estimated force value;

determining, by a braking control module, a control signal of an electro-mechanical actuator of a brake caliper of the braking system on the basis of the control quantity and of the reference force value; and providing, by the braking control module, said control signal to said electro-mechanical actuator.

2. The method according to claim 1, wherein the step of determining, by the force estimation and validation module, the control quantity comprises:

determining, by the first force estimation submodule, the estimated force value on the basis of said first intermediate information and of said second input information;

detecting, by at least one force sensor, operatively associated with the second force validation submodule, a force value applied by the electro-mechanical actuator to the brake caliper of the braking system; and determining, by the second force validation submodule, the control quantity on the basis of the estimated force value and of the detected force value applied by the electro-mechanical actuator to the brake caliper of the braking system.

3. The method according to claim 1, further comprising:

providing, by the vehicle control module, the determined reference force value, on the basis of the first input information and of the braking request, directly to the first force estimation submodule;

determining, by the first force estimation submodule, the control quantity on the basis of the estimated force value and of the determined reference force value, the control quantity being a position value of the electro-mechanical actuator of the brake caliper of the brake system corresponding to the determined reference force value;

detecting, by at least one force sensor, operatively associated with the second force validation submodule, a force value applied by the electro-mechanical actuator to the brake caliper of the braking system; and determining, by the second force validation submodule, the validated force value on the basis of the estimated force value and of the detected force value applied by the electro-mechanical actuator to the brake caliper of the braking system.

4. A method for controlling a braking system of a vehicle, the method comprising:

receiving, by a vehicle control module, a braking request, receiving, by the vehicle control module, a first input information, determining, by the vehicle control module, first intermediate information on the basis of said first input information, determining, by the vehicle control module, a reference force value on the basis of the first input information and of the braking request, detecting, by a first plurality of detecting devices, second input information, determining, by a first force estimation submodule, an estimated force value based on said first intermediate information and said second input information, determining, by a second force estimation submodule, a validated force value and a control quantity based only on a detected force value from a force sensor and said estimated force value determined by the first force estimation submodule, wherein said second force estimation submodule is separate from the first force estimation submodule, determining, by a braking control module, a control signal based on at least the control quantity from the second estimation submodule and the reference force value from the vehicle control module, providing, by the braking control module, said control signal to an electric drive module, and providing, by the electric drive module, a drive signal to an electro-mechanical actuator.

5. The method according to claim 4, wherein the reference force value is not received by the first force estimation submodule.

6. The method according to claim 4, wherein the reference force value is received only by the braking control module.

7. A method for controlling a braking system of a vehicle, the method comprising:

receiving, by a vehicle control module, a braking request, receiving, by the vehicle control module, a first input information, determining, by the vehicle control module, first intermediate information on the basis of said first input information, determining, by the vehicle control module, a reference force value on the basis of the first input information and of the braking request, detecting, by a first plurality of detecting devices, second input information, determining, by a first force estimation submodule, a control quantity and an estimated force value based on said first intermediate information, said reference force value, and said second input information, determining, by a second force estimation submodule, a validated force value based only on a detected force value from a force sensor and said estimated force value, wherein said second force estimation submodule is separate from the first force estimation submodule, determining, by a braking control module, a control signal based only on the control quantity from the first estimation submodule, providing, by the braking control module, said control signal to an electric drive module, and providing, by the electric drive module, a drive signal to an electro-mechanical actuator.

8. The method according to claim 7, wherein the reference force value is provided by the vehicle control module only to the first force estimation submodule.

9. The method according to claim 7, wherein the estimated force value is provided by the first force estimation submodule only to the second force estimation submodule.

10. The method according to claim 7, wherein the validated force value is provided by the second force estimation submodule only to a diagnostics and safety module.

11. The method according to claim 7, wherein the validated force value is the only value received by the diagnostics and safety module.

* * * * *